United States Patent [19]

Takayama et al.

[11] Patent Number: 5,185,417
[45] Date of Patent: Feb. 9, 1993

[54] POLYMERIZABLE COMPOSITIONS AND IN-MOLD CURED PRODUCTS USING SAME

[75] Inventors: Yuuji Takayama, Kanagawa; Hirokazu Matsueda, Aichi; Masato Sugiura, Aichi; Tatsuhiko Ozaki, Aichi; Hirotaka Wada, Aichi; Iwao Komiya, Aichi, all of Japan

[73] Assignee: Takemoto Yushi, Kabushiki Kaisha, Aichi, Japan

[21] Appl. No.: 865,977

[22] Filed: Apr. 9, 1992

[30] Foreign Application Priority Data

Apr. 12, 1991 [JP] Japan .................................. 3-108944

[51] Int. Cl.$^5$ ..................... C08F 236/22; C08F 236/20
[52] U.S. Cl. ................................. 526/301; 560/158; 560/160
[58] Field of Search ................. 526/301; 560/158, 160

[56] References Cited

U.S. PATENT DOCUMENTS 4,098,918 7/1978 DeMajistre ........................... 427/36

Primary Examiner—Joseph L. Schofer
Assistant Examiner—M. Nagumo
Attorney, Agent, or Firm—Heller, Ehrman, White & McAulilffe

[57] ABSTRACT

Unsaturated urethane having specified molecular structure shown by Formula (1) given below and vinyl monomers which are copolymerizable with such unsaturated urethane can form together polymerizable compositions which, as well as in-mold cured products therefrom, have improved characteristics such as compatibility between the constituents and water resistance:

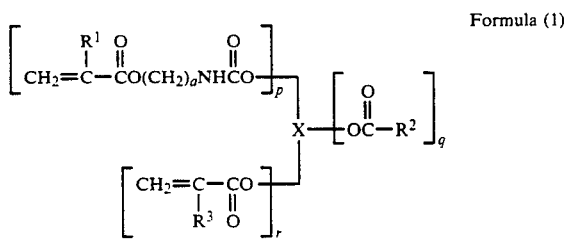

Formula (1)

where X is a residual group obtained by removing the hydroxyl groups from a trihydric or tetrahydric polyol; $R^1$ and $R^3$ are each H or $CH_3$; $R^2$ is higher aliphatic hydrocarbon group with 5~21 carbon atoms; p and q are each 1 or 2; r is an integer 0~2 such that p+q+r=3 or 4 and p+r=2 or 3; and a is an integer 2~4.

8 Claims, No Drawings

POLYMERIZABLE COMPOSITIONS AND IN-MOLD CURED PRODUCTS USING SAME

BACKGROUND OF THE INVENTION

This invention relates to polymerizable compositions for in-mold curing and in-mold cured products obtained from such compositions.

Polymerizable compositions are widely in use. For example, molded products from polymerizable compositions containing unsaturated polyester resin have been used as external panels and accessaries of automobiles. There are a number of molding methods available for obtaining molded objects from polymerizable composition, including the compression molding method using sheet molding compound (SMC), the injection molding method using bulk molding compound (BMC), the hand lay-up method whereby polymerizable compositions impregnate a reinforcing fiber mat, textile or strands and is hardened, and the pultrusion method. In addition, examples of method known as the most ideal and economical for obtaining molded objects include the resin transfer molding (RTM) and reaction injection molding (RIM) whereby a polymerizable composition is introduced into a mold for quick in-mold curing.

As examples of prior art polymerizable compositions containing unsaturated urethane, U.S. Pat. No. 4,480,079 and European Patent Publication EP197682 have disclosed polymerizable composition comprising unsaturated urethane and alkyl (meth)acrylate obtained from polyisocyanate and hydroxy alkyl (meth)acrylate.

The aforementioned prior art polymerizable compositions, however, have the following disadvantages because of their use of unsaturated urethane obtained from polyisocyanate and hydroxy alkyl (meth)acrylate:

(1) Since unsaturated urethane and alkyl (meth)acrylate, which are obtained together by such a prior art method, are not sufficiently compatible with respect to each other, sedimentation and separation are likely to take place especially at low temperatures;

(2) Since unsaturated urethane thus obtained contains many urethane bonds within its molecule, it is inferior in water resistance, like most other kinds of polyurethane liquid resin, as compared to other thermosetting polymerizable compositions. This limits the use of the in-mold cured products obtained therefrom; and (3) Since the density of cross-links is high in such in-mold cured products, mold shrinkage at the time of their curing is large compared to unsaturated polyester liquid resins. As a result, generation of cracks and appearance of fiber patterns are prominently observed. Low shrinkage agents may be used for preventing such phenomena but they are not very effective.

SUMMARY OF THE INVENTION

The basic object of the present invention is to eliminate the disadvantages (1)~(3) given above related to prior art polymerizable compositions containing unsaturated urethane.

In other words, it is an object of the present invention to provide polymerizable compositions comprising unsaturated urethane and vinyl monomers with improved compatibility with respect to each other.

It is another object of the present invention to provide polymerizable compositions which comprise unsaturated urethane having higher aliphatic hydrocarbon groups and have improved water resistance.

It is still another object of the present invention to provide polymerizable compositions from which in-mold cured objects with lower density of cross-links can be obtained.

It is a further object of the present invention to provide in-mold cured products which are made from such polymerizable compositions and on which cracks and fiber patterns do not show easily.

The present inventors have conducted research on polymerizable compositions comprising unsaturated urethane and vinyl monomers which can be copolymerized therewith and in-mold cured products obtained from such polymerizable compositions. As a result of research, in particular, on the relationship between the chemical structure of unsaturated urethane and the characteristics of in-mold cured products therefrom, it has been discovered that it is preferable to use, at a specified ratio, unsaturated urethane having introduced thereinto specified amounts of radical polymerizable groups comprising (meth)acryloyl groups and hydrophobic groups including higher hydrocarbon residual groups.

DETAILED DESCRIPTION OF THE INVENTION

This invention relates to polymerizable compositions comprising unsaturated urethane shown by Formula (1) given below and vinyl monomers, which are copolymerizable with this unsaturated urethane, at the weight ratio of (unsaturated urethane)/(vinyl monomers) = 10/90~90/10, as well as to molded products obtained by curing such compositions:

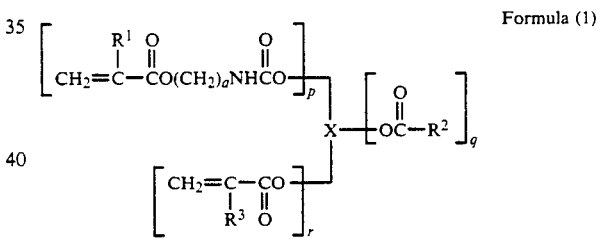

Formula (1)

where X is a residual group obtained by removing hydroxyl group from trihydric or tetrahydric polyol; $R^1$ and $R^3$ are each H or $CH_3$; $R^2$ is higher aliphatic hydrocarbon group with 5~21 carbon atoms; p and q are each 1 or 2; r is an integer 0~2 such that p+q+r=3 or 4 and p+r=2 or 3; and a is an integer 2~4.

The unsaturated urethane shown by Formula (1) for polymerizable compositions of the present invention is a urethane compound obtained by reacting partial ester which is derived from trihydric or tetrahydric polyol and higher aliphatic acid (hereinafter referred to simply as partial ester) with unsaturated monoisocyanate having (meth)acryloyl group (hereinafter referred to simply as unsaturated monoisocyanate), or by reacting mixed partial ester which is derived from trihydric or tetrahydric polyol, (meth)acrylic acid and higher aliphatic acid (hereinafter referred to simply as mixed partial ester) with unsaturated monoisocyanate.

Examples of trihydric and tetrahydric polyols include (1) trihydric alcohols such as glycerine, trimethylol ethane and trimethylol propane, (2) tetrahydric alcohols such as pentaerythritol, (3) polyether polyols obtained by adding alkylene oxide such as ethylene oxide, propylene oxide and butylene oxide to such trihydric or tetrahydric alcohol, and (4) polyester polyols obtained by adding aliphatic lactone such as caprolactone and butylolactone to such trihydric or tetrahydric alcohol.

The higher aliphatic acids to be used for deriving the aforementioned partial esters include saturated and unsaturated aliphatic acids with 6~22 carbon atoms having a straight or branched chain. Examples of such higher aliphatic acids include (1) straight chain saturated aliphatic acids such as hexanoic acid, octanoic acid, dodecanoic acid and stearic acid, (2) branched chain saturated aliphatic acids such as isooctanoic acid, isopalmitic acid and isostearic acid, (3) unsaturated aliphatic acids such as oleic acid and elaidic acid, and mixtures of the above.

Examples of partial ester include (1) higher aliphatic acid monoesters of trihydric alcohol such as glycerine monooctanoate, glycerine monoisopalmitate and 5-methyl-1,2,4-heptane triol monooleate, (2) higher aliphatic acid monoesters and diesters of tetrahydric alcohol such as pentaerythritol monolaurate, pentaerythritol di-2-ethyl hexoate and pentaerythritol diisostearate, (3) higher aliphatic monoesters of polyether triol or polyester triol such as tri(2-hydroxyethoxy) trimethylol propane monoisononanoate, polypropoxylated glycerine monolaurate and monolaurate of ε-caprolactone adducted-trimethylol propane, and (4) higher aliphatic acid monoesters and diesters of (poly)ether tetraols and polyester tetraols such as butoxylated pentaerythritol monooctanoate, didecanoate of γ-butylolactone adducted-pentaerythritol and diglycerine dioleate.

The methods of synthesizing partial ester include direct esterification reactions between polyol and higher aliphatic acid, addition reactions of higher aliphatic acid partial ester of polyhydric alcohol to alkylene oxide and ring-opening addition reactions between glycidyl ester of higher aliphatic acid and polyol. The present invention, however, is not limited by the method of such synthesis.

The unsaturated monoisocyanates to be reacted with partial ester according to the present invention are (meth)acryloyl oxyalkyl isocyanates with alkyl group having 2~4 carbon atoms. Examples of such unsaturated monoisocyanate include acryloyl oxyethyl isocyanate, acryloyl oxy-2-methylethylisocyanate, methacryloyl oxyethyl isocyanate and methacryloyl oxy-2-methyl-ethylisocyanate. Among these, methacryloyl oxyethyl isocyanate is preferred.

As the unsaturated urethane according to the present invention, use may be made of urethane compounds obtained by reacting mixed partial esters which are derived from polyols, (meth)acrylic acids and higher aliphatic acids with unsaturated monoisocyanates. When such a mixed partial ester is derived, the molar ratios of (meth)acrylic acid and higher aliphatic acid to be used with 1 mole of polyol are determined such that at least one free hydroxyl group will remain.

Examples of mixed partial ester includes (1) mixed partial esters of trihydric alcohol such as glycerine monomethacrylate.monoisopalmitate, trimethylol propane monomethacrylate.monolaurate and 5-methyl-1,2,4-heptane triol monomethacrylate.monooleate, (2) mixed partial esters of tetrahydric alcohol such as pentaerythritol monomethacrylate.monooleate, pentaerythritol diacrylate.mono-2-ethyl hexoate and pentaerythritol monomethacrylate.dilaurate, and (3) mixed partial esters of polyether polyol or polyester polyol such as trimethylol propane mono(2-hydroxyethyl) ether monomethacrylate.monoisononanoate, polyethoxylated trimethylol propane monoacrylate.monooctanoate and monomethacrylate.didecanoate of ε-caprolactone adducted-pentaerythritol.

The present invention is not limited by a method of synthesizing mixed partial ester, but use may be made advantageously of mixed partial ester of glycerine mono(meth)acrylic acid and higher monoaliphatic acid obtained by ring-opening addition reaction between glycidyl (meth)acrylate and higher aliphatic acid or ring-opening addition reaction of higher aliphatic glycidyl ester and (meth)acrylic acid.

As explained above, the unsaturated urethane, which is used according to the present invention, is a urethane composition obtained by reacting partial ester or mixed partial ester (hereinafter referred to together as partial esters) and unsaturated monoisocyanates, but the invention is not limited by a method of synthesizing the unsaturated urethane. It is preferred that the ratio of reacting unsaturated monoisocyanates and partial esters be 1/1 by molar ratio of functional groups (NCO/OH) when unsaturated urethane is synthesized, but no particular ill-effects are encountered if the ratio is varied within the range of 1/0.95~0.95/1.

According to accepted methods of synthesizing unsaturated urethane, an inactive solvent is added to partial esters or mixed partial esters. A catalyst such as tertiary amine, metallic salt or preferably di-n-butyl tin dilaurate, which are well known for the synthesis of polyurethane, is used, and unsaturated monoisocyanate is gradually added while temperature is maintained at 30°~80° C. In this situation, it is preferable to use a vinyl monomer such as alkyl (meth)acrylate or styrene as the inactive solvent because there will then be no need to remove it after the reaction.

There is no particular limitation as to the kind of vinyl monomers to be used as reaction dilutant for unsaturated urethane in connection with polymerizable compositions of the present invention, as long as they are copolymerizable with the unsaturated urethane. Examples of such vinyl monomers include (1) alkyl (meth)acrylates such as methyl methacrylate, methyl acrylate, ethyl methacrylate and ethyl acrylate, (2) vinyl aromatic hydrocarbons such as styrene, methyl styrene and divinyl benzene, and (3) diaryl phthalate. They may be used singly or as a mixture of two or more. From the point of view of the properties of the in-mold cured products obtained therefrom, however, methyl methacrylate, styrene and their mixtures are preferable.

Polymerizable compositions according to the present invention comprise unsaturated urethane and vinyl monomers which are copolymerizable with the unsaturated urethane, their molar weight ratio being (unsaturated urethane)/(vinyl monomers) being 10/90~90/10 and, more preferably, 40/60~75/25. If this ratio is smaller than 10/90, the curing speed is too low and the physical properties of the in-mold cured products obtained from them become poorer. If it exceeds 90/10, on the other hand, viscosity of the liquid resin becomes too high.

The unsaturated urethane according to the present invention has within its molecule at least two radical polymerizable double bonds and at least one higher aliphatic hydrocarbon group. The number of such double bonds contained in a molecule and the molecular weight of the unsaturated urethane per double bond affect the speed of its curing speed. In order to obtain a practically convenient curing reaction speed, the unsaturated urethane should be such that its molecular weight per such double bond is in the range of 200~450 and, more preferably, in the range of 250~400.

Polymerizable compositions according to the present invention do not develop precipitation or separation even at a cooler temperature and are generally stable because their unsaturated urethane and vinyl monomers have superior compatibility. The in-mold cured products from such polymerizable compositions have reduced problems related to water resistance and mold shrinkage.

In order to realize such characteristics, higher aliphatic hydrocarbon groups with 5~21 carbon atoms are introduced into the unsaturated urethane molecules according to the present invention. Particularly preferable examples of such higher aliphatic hydrocarbon groups include alkyl and isoalkyl groups with 7~17 carbon atoms and alkenyl groups with 16~19 carbon atoms. The number of higher aliphatic hydrocarbon groups to be introduced is 1 in the case of unsaturated urethane obtained from trihydric polyol, and it is 1 or 2 in the case of unsaturated urethane obtained from tetrahydric polyol. It is preferable, however, that the weight ratio of higher aliphatic hydrocarbon groups in the unsaturated urethane molecule be 15~45 weight %, and it is more preferable that this be 20~40 weight %.

Polymerizable compositions according to the present invention may contain inorganic powder filler material in addition to unsaturated urethane and vinyl monomers. There is no particular limitation on the amount of such inorganic filler material to be contained. It varies according to its kind, size, the molding method of liquid resin composition and the desired properties of the molded products obtained by curing. In general, however, the preferred ratio is less than 230 weight parts per 100 weight parts for the sum of unsaturated urethane and vinyl monomers, and it is more preferably less than 100 weight parts.

Examples of inorganic powder filler material include alumina trihydrate ($Al_2O_3.3H_2O$), calcium carbonate, silica and calcium sulfate dihydrate ($CaSO_4.2H_2O$). If use is made of a material containing water of crystallization, flame-retarding property can be gained by the in-mold cured products to be obtained by curing.

Many methods for preparing unsaturated polyester liquid resins can be used for the preparation of polymerizable compositions of the present invention.

The products according to the present invention are obtained by in-mold curing of polymerizable compositions of the present invention. In-mold curing methods known for unsaturated polyester resins and their compositions can be applied. For example, curing agents and curing accelerators of many kinds can be used for radical polymerization.

Examples of curing agent include dibenzoyl peroxide, t-butyl peroxy-2-ethyl hexanoate, t-butyl peroxy benzoate, 1,1-di-t-butyl peroxy-3,3,5-trimethyl cyclohexane, and bis(4-t-butyl cyclohexyl) peroxy dicarbonate. They may be used singly or as a mixture of two or more. Examples of curing accelerator include tertiary amines such as N,N-dimethyl-p-toluidine and N,N-dimethyl aniline. The curing agent is normally used at the rate of 1~5 weight % with respect to the liquid resin of the present invention or the whole of the liquid resin composition of the invention. A mold releasing agent may also be used in the case of in-mold curing. Examples of such mold releasing agent include metallic soap of, say, zinc stearate, and Zelec UN (which is a trade name for phosphoric ester produced by E. I. duPont de Nemours and Co.).

Polymerizable compositions of the present invention can be easily cured and molded by any of the in-mold curing methods such as the pultrusion method, the injection molding by the use of BMC, the compression molding by using SMC, the resin transfer molding, and the reaction injection molding.

The present invention will be described next by way of examples such that its characteristics and effects can be more clearly understood, but the present invention is not intended to be limited by these examples. In what follows, weight parts will be simply referred to as parts, and weight % will be simply referred to as %.

TESTS AND RESULTS

Test Example 1 (Synthesis of unsaturated urethane A and preparation of polymerizable composition a)

Use was made of 134 parts (1.0 mole) of trimethylol propane, 200 parts (1.0 mole) of lauric acid, 300 parts of toluene and 2 parts of 98% sulfuric acid as catalyst. They were heated under azeotropic condition of toluene and water. By-product water was distilled away from the reacting system and esterification reaction was carried out. After a theoretically determined amount of water has been distilled away, the reaction was further continued for an hour below the boiling point of toluene to complete the esterification. After the reaction product was cooled to a temperature below 60° C., an adsorbent (Kyoowaado 400, produced by Kyowa Kagaku Kogyo-sha of Japan) 10 parts was added and stirred. Thereafter, the adsorbent was filtered and separated. The filtered liquid was heated under reduced pressure to distill away the toluene used as solvent and to obtain 307 parts of trimethylol propane monolaurate. It had acid value 0.2, hydroxyl value 353 and saponification value 178.

Use was made of 158 parts (0.5 moles) of trimethylol propane monolaurate thus obtained, 209 parts of methyl methacrylate and 0.5 parts of di-n-butyl tin dilaurate, and they were maintained at 50° C. and stirred. Thereafter, methacryloyl oxyethyl isocyanate 310 parts (1.0 mole) was dropped in over a period of 30 minutes. Although reaction heat was generated during this process, the reaction temperature was maintained below 60° C. The synthesis was completed by thereafter maintaining it for one hour at 60° C. to obtain polymerizable composition a containing 60% of unsaturated urethane A. This polymerizable composition a was left for 48 hours at 5° C. but neither separation of solid component nor turbidity was observed.

Test Example 4 (Synthesis of unsaturated urethane D and preparation of polymerizable composition d)

Use was made of 256 parts (1.0 mole) of isopalmitic acid and 3 parts of triethylamine as catalyst. They were maintained at 70° C. and stirred. Thereafter, glycidyl methacrylate 142 parts (1.0 mole) was dropped over a period of 30 minutes. The synthesis was completed by thereafter maintaining the reaction system for 5 hours as 70° C. Hardly any oxirane oxygen was detected in the reaction product. What was obtained by this process was 398 parts of glycerine monomethacrylate.monoisopalmitate of acid value 1.5, hydroxyl value 139 and saponification value 279.

Use was then made of 199 parts (0.5 moles) of glycerine monomethacrylate.monoisopalmitate thus obtained, 185 parts of methyl methacrylate, 0.5 parts of di-n-butyl tin dilaurate and 78 parts (0.5 moles) of methacryloyl oxyethyl isocyanate. They were processed as described above for the synthesis of unsaturated urethane A to obtain polymerizable composition d containing 60% of unsaturated urethane D. Although this polymerizable composition d was left for 48 hours at 5° C., neither separation of solid component nor turbidity was observed.

Test Example 2 (synthesis of unsaturated urethane B and preparation of polymerizable composition )), Test Example 3 (synthesis of unsaturated urethane C and preparation of polymerizable composition c), Test Example 5 (synthesis of unsaturated urethane E and preparation of polymerizable composition e), Test Example 6 (synthesis of unsaturated urethane F and preparation of polymerizable composition f), and Test Example 7 (synthesis of unsaturated urethane G and preparation of polymerizable composition g) were similarly carried out. Although polymerizable compositions b, c, e, f and g were left for 48 hours at 5° C., neither separation of solid component nor turbidity was observed.

Comparison Example 1 (Synthesis of unsaturated urethane R-1 and preparation of polymerizable composition r-1)

Use was made of 130 parts (1.0 mole) of 2-hydroxyethyl methacrylate, 87 parts (0.5 moles) of Kolonate T-80 ® (mixture of 2,4- and 2,6-tolylene diisocyanate produced by Nippon Polyurethane Industry, Co., Ltd.), 0.9 parts of di-n-butyl tin dilaurate and 145 parts of methyl methacrylate to obtain polymerizable composition r-1 containing 60% of unsaturated urethane R-1 by processing similarly as for the synthesis of unsaturated urethane A. Turbidity was observed when this polymerizable composition r-1 was left for 24 hours at room temperature.

Comparison Example 2 (Synthesis of unsaturated urethane R-2 and preparation of polymerizable composition r-2)

Glycerine monomethacrylate.monoacetate was obtained exactly as in the case of glycerine monomethacrylate.monoisopalmitate for the synthesis of unsaturated urethane D except use was made of 60 parts (1.0 mole) of acetic acid instead of 256 parts of isopalmitic acid. It had acid value 1.7, hydroxyl value 142 and saponification value 283.

Polymerizable composition r-2 containing 60% of unsaturated urethane R-2 was obtained by using 202 parts (1.0 mole) of glycerine monomethacrylate.monoacetate thus obtained, 238 parts of methyl methacrylate, 0.5 parts of di-n-butyl tin laurate and 155 parts (1.0 mole) of methacryloyl oxyethyl isocyanate and proceeding as for the synthesis of unsaturated urethane D. Although this polymerizable composition r-2 was left for 48 hours at 5° C., neither separation of solid component nor turbidity was observed.

The kinds and amounts of partial esters, unsaturated monoisocyanates and vinyl monomers used for the syntheses are shown in Table 1. The properties of obtained unsaturated urethanes are shown in Table 2.

Production of molded products by resin transfer molding (RTM) and their evaluation A glass strand continuous mat (Unifilo U-750, produced by Nippon Electric Glass Co., Ltd.) was set in a nickel metallized mold heated to 35° C. such that the glass content would be 25% and the mold was tightened to 2.5 kg/cm². Thereafter, specified amounts of the polymerizable compositions and radical initiator solutions shown in Table 3 were injected individually into the mold by using measuring pumps through a static mixer to form uniform mixtures. The injection was stopped at the point in time when the injected liquid began to flow out from a clearance opposite from the injection opening. The product was taken out of the mold 20 minutes after the injection was stopped. For each product thus obtained, fiber patterns and occurrence of cracks were visually examined. The results are also shown in Table 3.

Production of molded products by casting molding and their evaluation

A polyethylene tube of outer diameter 5 mm was sandwiched between two glass sheets (25 cm×25 cm) of thickness 5 mm to form a mold with a clearance of 3 mm. The polymerizable compositions and radical initiator solutions shown in Table 4 were uniformly mixed together and poured into this mold. The mold was placed inside a thermostat of 35° C., and it was left overnight at 80° C. to obtain molded products.

Test pieces of length 80 mm, width 25 mm and thickness 3 mm were prepared by using a diamond cutter to cut these molded products. After these test pieces were accurately weighed, they were immersed in warm water of 80° C. for 30 hours. After they were taken out, their external appearance was examined regarding whitening and occurrence of cracks. The weight of each test piece was compared before and after the testing to calculate the water absorbing capacity according to the formula given below. The flexural strength was also measured according to JIS-K6911 to determine the lowering in flexural strength.

Water absorbing capacity (%) = {((Weight after testing) − (Weight before testing))/(Weight before testing)} × 100.

Lowering in flexural strength (%) = {((Strength before testing) − (Strength after testing))/(Strength before testing)} × 100.

These test results are also shown in Table 4, in which the water absorbing capacity and the lowering in flexural strength are shown by an average of three measured values.

As may be already clear from the above, the present invention has the effects of providing polymerizable compositions which do not generate solids or turbidity and have superior compatibility, and molded products with improved appearance and water-resistance and small mold shrinkage.

TABLE 1

| Unsaturated urethane Type | Partial esters | | Unsaturated monoisocyanates | | Vinyl monomers | |
|---|---|---|---|---|---|---|
| | Type | Amount | Type | Amount | Type | Amount |
| A | *1 | 158 0.5 | MOI | 155 1.0 | MMA | 209 |
| B | *2 | 144 0.5 | MOI | 155 1.0 | MMA | 199 |
| C | *3 | 209 0.5 | AOI | 155 1.0 | ST | 243 |
| D | *4 | 199 0.5 | MOI | 78 0.5 | MMA | 185 |
| E | *5 | 268 0.5 | MOI | 78 0.5 | MMA | 231 |

TABLE 1-continued

| Un-saturated urethane Type | Partial esters Type | Partial esters Amount | Unsaturated mono-isocyanates Type | Unsaturated mono-isocyanates Amount | Vinyl monomers Type | Vinyl monomers Amount |
|---|---|---|---|---|---|---|
| F | *6 | 172 / 0.5 | MOI | 78 / 0.5 | MMA | 167 |
| G | *7 | 224 / 0.5 | MOI | 78 / 0.5 | ST | 201 |
| R-1 | — | — | — | — | — | — |
| R-2 | *8 | 202 / 1.0 | MOI | 155 / 1.0 | MMA | 238 |

Notes:
Amount: Upper and lower numbers indicate parts and moles.
*1: Trimethylol propane monolaurate

TABLE 2

| Unsaturated urethane Type | Molecular weight (a) | Number of radical polymerizable double bonds in one molecule (b) | a/b | Content of higher alkyl groups (weight %) |
|---|---|---|---|---|
| A | 627 | 2 | 314 | 25 |
| B | 599 | 2 | 300 | 21 |
| C | 729 | 2 | 365 | 27 |
| D | 554 | 2 | 277 | 38 |
| E | 692 | 3 | 231 | 34 |
| F | 500 | 2 | 250 | 23 |
| G | 598 | 2 | 299 | 26 |
| R-1 | 434 | 2 | 217 | 0 |
| R-2 | 357 | 2 | 179 | 0 |

TABLE 3

| | Tests Examples | | | | | | | Comparison Examples | | | |
|---|---|---|---|---|---|---|---|---|---|---|---|
| | 8 | 9 | 10 | 11 | 12 | 13 | 14 | 3 | 4 | 5 | 6 |
| (Polymerizable composition) | | | | | | | | | | | |
| Polymerizable composition | a | b | c | d | e | f | g | r-1 | r-2 | r-1 | r-2 |
| | 100 | 100 | 100 | 100 | 100 | 100 | 100 | 100 | 100 | 100 | 100 |
| Aluminum hydroxide | 50 | 50 | 50 | 50 | 50 | 50 | 50 | 50 | 50 | 50 | 50 |
| N,N-dimethyl-p-toluidine | *9 | *9 | *9 | *9 | *9 | *9 | *9 | *9 | *9 | *9 | *9 |
| Mold releasing agent | 0.5 | 0.5 | 0.5 | 0.5 | 0.5 | 0.5 | 0.5 | 0.5 | 0.5 | 0.5 | 0.5 |
| Low shrinking agent | — | — | — | — | — | — | — | — | — | 40 | 40 |
| (Radical initiator) *10 | 2.0 | 2.0 | 2.0 | 2.0 | 2.0 | 2.0 | 2.0 | 2.0 | 2.0 | 2.0 | 2.0 |
| (Results) | | | | | | | | | | | |
| Fiber patterns | No | No | No | No | No | No | No | Yes | Yes | Yes | Yes |
| Occurrence of cracks | No | No | No | No | No | No | No | Yes | Yes | Yes | Yes |

Notes:
Polymerizable composition: Type (upper line) Weight part (lower line)
Mold releasing agent: Mold Wiz (produced by Kozakura Shokai Co., Ltd.)
Low shrinking agent for Comparison Example 5: 40 parts of polyvinyl acetate (molecular weight = 200,000) dissolved in 60 parts of methyl methacrylate
Low shrinking agent for Comparison Example 6: 33.3 parts of polypropylene adipate (molecular weight = 5000) dissolved in 66.7 parts of styrene
*9: 0.075
*10: 50% solution of dibenzoyl peroxide (Nyper BMT—M produced by Nippon Oil and Fats Co., Ltd.)
Spots of phase-separated portions of low shrinking agents were observed on the surfaces of molded products from Comparison Examples 5 and 6.

TABLE 4

| | Test Examples | | | | | | | Comparison Examples | | | |
|---|---|---|---|---|---|---|---|---|---|---|---|
| | 15 | 16 | 17 | 18 | 19 | 20 | 21 | 7 | 8 | 9 | 10 |
| (Polymerizable composition) | | | | | | | | | | | |
| Polymerizable composition | a | b | c | d | e | f | g | r-1 | r-2 | r-1 | r-2 |
| | 100 | 100 | 100 | 100 | 100 | 100 | 100 | 100 | 100 | 100 | 100 |
| N,N-dimethyl-p-toluidine | *9 | *9 | *9 | *9 | *9 | *9 | *9 | *9 | *9 | *9 | *9 |
| Mold releasing agent | 0.5 | 0.5 | 0.5 | 0.5 | 0.5 | 0.5 | 0.5 | 0.5 | 0.5 | 0.5 | 0.5 |
| Low shrinking agent | — | — | — | — | — | — | — | — | — | 40 | 40 |
| (Radical initiator) *10 | 2.0 | 2.0 | 2.0 | 2.0 | 2.0 | 2.0 | 2.0 | 2.0 | 2.0 | 2.0 | 2.0 |
| (Results) | | | | | | | | | | | |
| Whitening and Cracks | No | No | No | No | No | No | No | Yes | Yes | Yes | Yes |
| Water absorbing Capacity | 0.3 | 0.3 | 0.2 | 0.2 | 0.3 | 0.3 | 0.2 | 1.2 | 0.9 | 2.1 | 1.0 |
| Lowering in flexural strength | 12.7 | 13.1 | 9.5 | 9.2 | 12.6 | 11.9 | 10.0 | 25.1 | 20.2 | 35.2 | 27.6 |

(Notes): See Notes to Table 3 regarding the polymerizable composition, mold releasing agents, low shrinking agents, *9 and *10.

*2: 1,2,6-hexane triol monodecanoate
*3: Diglycerine dioctanoate
*4: Glycerine monomethacrylate.monoisopalmitate
*5: Pentaerythritol dimethacrylate.monooleate
*6: Glycerine-2-hydroxy ethylether monomethacrylate.monoisononanoate
*7: Glycerine-6-hydroxy hexanoate monoacrylate.monolaurate
*8: Glycerine monomethacrylate.monoacetate
MOI: Methacryloyl oxyethyl isocyanate
AOI: Acryloyl Oxypropyl isocyanate
MMA: Methyl methacrylate
ST: Styrene

What is claimed is

1. A polymerizable composition comprising unsaturated urethane shown by Formula (1) given below and vinyl monomers at weight ratio of (unsaturated urethane)/(vinyl monomers)=10/90~90/10, said vinyl monomers being copolymerizable with said unsaturated urethane:

Formula (1)

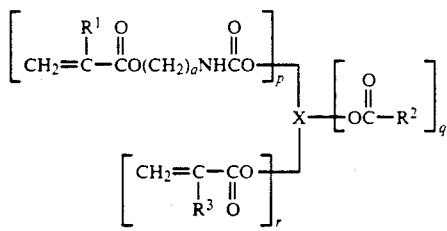

where X is a residual group obtained by removing the hydroxyl groups from a trihydric or tetrahydric polyol; $R^1$ and $R^3$ are each H or $CH_3$; $R^2$ is higher aliphatic hydrocarbon group with 5 ~21 carbon atoms; p and q are each 1 or 2; r is an integer 0 ~2 such that $p+q+r=3$ or 4 and $p+r=2$ or 3; and a is an integer 2~4.

2. The polymerizable composition of claim 1 further comprising inorganic powder filler material.

3. The polymerizable composition of claim 1 wherein said vinyl monomers are methyl methacrylate, styrene or a mixture thereof.

4. The polymerizable composition of claim 2 wherein said vinyl monomers are methyl methacrylate, styrene or a mixture thereof.

5. A product obtained by in-mold curing of a polymerizable composition, said polymerizable composition comprising unsaturated urethane shown by Formula (1) given below and vinyl monomers at weight ratio of (unsaturated urethane)/(vinyl monomers)=10/90~90/10, said vinyl monomers being co-polymerizable with said unsaturated urethane:

Formula (1)

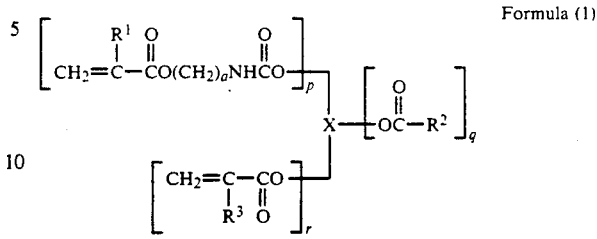

where X is a residual group obtained by removing the hydroxyl groups from a trihydric or tetrahydric polyol; $R^1$ and $R^3$ are each H or $CH_3$; $R^2$ is higher aliphatic hydrocarbon group with 5 ~21 carbon atoms; p and q are each 1 or 2; r is an integer 0 ~2 such that $p+q+r=3$ or 4 and $p+r=2$ or 3; and a is an integer 2~4.

6. The product of claim 5 wherein said polymerizable composition further comprises inorganic powder filler material.

7. The product of claim 5 wherein said vinyl monomers are methyl methacrylate, styrene or a mixture thereof.

8. The product of claim 6 wherein said vinyl monomers are methyl methacrylate, styrene or a mixture thereof.

* * * * *